United States Patent [19]

Brookner et al.

[11] Patent Number: 4,837,714

[45] Date of Patent: Jun. 6, 1989

[54] METHODS AND APPARATUS FOR CUSTOMIZING AND TESTING FULLY ASSEMBLED POSTAGE METERS

[75] Inventors: George M. Brookner, Norwalk; Sung S. Change, Stamford, both of Conn.

[73] Assignee: Pitney Bowes, Inc., Stamford, Conn.

[21] Appl. No.: 140,862

[22] Filed: Dec. 28, 1987

Related U.S. Application Data

[63] Continuation of Ser. No. 856,530, Apr. 18, 1986, abandoned.

[51] Int. Cl.[4] ........................ G06F 15/20; G06F 15/22

[52] U.S. Cl. .................................... 364/550; 364/900; 364/466; 364/464.02

[58] Field of Search ............... 364/464, 466, 900, 550; 235/101

[56] References Cited

U.S. PATENT DOCUMENTS 3,652,795 3/1972 Wolf et al. .

4,424,573 1/1984 Eckert, Jr. et al. ................. 364/900

4,528,644 7/1985 Soderberg et al. ................. 364/900

4,636,975 1/1987 Sodeberg et al. ................... 364/900

*Primary Examiner*—Parshotam S. Lall

*Assistant Examiner*—Ellis B. Ramirez

*Attorney, Agent, or Firm*—Charles G. Parks, Jr.; David E. Pitchenik; Melvin J. Scolnick

[57] ABSTRACT

Methods and associated apparatus are disclosed for customizing and testing fully assembled postage meters in a secure manner. According to the invention, meters are customized under external, i.e. non-meter resident, program control. The external program control may be used to initialize meters, produce "blank" (unconfigured) meters, and configure either blank or previously configured meters, both at the factory and in the field. The ability to reconfigure fully assembled meters permits devices which have been put into service in one country to be easily reconfigured by authorized personnel, and placed into service in another country. The invention customizes meters in a manner that is transparent to the operator, maxmimizing the security of sensitive meter data by minimizing operator handling and access to such data. The invention also facilitates the "non-destructive" testing of fully assembled meters, i.e. meters need not be taken apart to, for example, analyze failures where a risk of losing data may result from disassembly. In addition, by minimizing the amount of resident meter software required to perform secure customization, the invention optimizes the use of internal meter resources, in particular, program storage.

23 Claims, 4 Drawing Sheets

METHODS AND APPARATUS FOR CUSTOMIZING AND TESTING FULLY ASSEMBLED POSTAGE METERS

This application is a continuation, of application Ser. No. 856,530, filed 4/28/86 now abandoned.

CROSS REFERENCE TO RELATED APPLICATIONS

The present application is related to copending application Ser. No. 823,901, filed Jan. 30, 1986, in the name of John H. Soderberg and George M. Brookner, entitled NONVOLATILE MEMORY UNLOCK FOR AN ELECTRONIC POSTAGE METER, which secure electronic postage meter the operating parameters of which may be modified post assembly by authorized personnel Such a meter is particularly well suited for use with the present invention.

BACKGROUND OF THE INVENTION

The present invention relates to methods and apparatus for customizing and testing meters and more particularly relates to the customization and testing of fully assembled electronic postage meters which operate under control of resident operating programs and include nonvolatile memories (NVMs), of the type such as disclosed in the aforementioned related patent application.

Known electronic postage meters employing firmware such as disclosed in U.S. Pat. No. 4,301,507, issued on Nov. 17, 1981, and assigned to Pitney Bowes, Inc. of Stamford, Connecticut, are programmed via (Programmable) Read Only Memory (PROMs) to undergo a certain sequence of operations. In dealing with a single postal system such as that in the United States, one setof software is programmed into the meter. However, when an electronic postage meter is used with a number of different postal systems, i.e., internationally, where the requirements of the postal systems of various countries vary widely, a number of different individual programs or software packages are required to accommodate the variations between the individual countries. Such a multiplicity of software packages greatly increases the cost of the meter.

In addition, prior art techniques for manufacturing meters for use in one of a multiplicity of countries are typical component oriented. According to these manufacturing techniques, NVMs are initialized and configured to produce country dependent NVM components. These components were subsequently handled by operators to fabricate meters for a given country in a batch type assembly operation. The data base installed in each NVM was designed to work with one of the aforesaid multiplicity of software packages in a meter's (P)ROM.

In order to increase the inherent reliability of meters by reducing the handling of components, it has proven to be desirable to be able to customize fully assembled meters.

Copending application Ser. No. 447,925, filed on Dec. 8, 1982, entitled, CONTROLLING FIRMWARE BRANCH POINTS IN AN ELECTRONIC POSTAGE METER, now U.S. Pat. No. 4,636,975, which a discloses one way in which a number of individually tailored software packages and user handling of components may be reduced by setting certain data bits in nonvolatile memory (NVM) of a fully assembled meter to control firmware branch points. Further, copending application Ser. No. 729,395, filed May 1, 1985, entitled MODIFYING A FIRMWARE VARIABLE IN AN ELECTRONIC POSTAGE METER, discloses another technique for reducing the number of individually tailored software packages and user handling of components by setting certain data bits in NVM of a fully assembled meter to modify a firmware variable in ROM.

The methods disclosed in both these copending applications are directed at modifying selected portions of programs or data sets stored in a postage meter, prior to shipment, to configure a meter for a chosen country. Both applications, for security reasons, call for locking out attempts to reconfigure a meter after the meter serial number is placed in memory.

Yet another method and apparatus for customizing a fully assemble meter is set forth in U.S. Pat. No. 4,528,644 to Soderberg,et al, entitled CUSTOMIZING THE FIRMWARE AFTER THE ASSEMBLY OF AN ELECTRONIC POSTAGE METER, assigned to the same assignee as the current invention.

The objects of the invention disclosed in U.S. Pat. No. 4,528,644 were to provide a customized electronic postage meter in which program variations are minimized; to provide customization of an electronic postage meter after final assembly (achieving the aforementioned increased inherent reliability); to provide an electronic postage meter which is capable of employing generalized firmware for use with different postal systems; and to provide a firmware controlled international electronic postage meter in which programming costs are minimized.

U.S. Pat. No. 4,528,644 teaches customizing a fully assembled meter by storing a configuration program within the electronic postage meter which program is capable of configuring the meter in response to configuration input messages, inputting configuration messages into the electronic postage meter to select the desired meter functions and provide data for use with operating programs stored in the meter, storing the configuration input data in the assembled meter under control of the meter configuration program for subsequent interaction with the operating programs of the meter to provide predetermined meter functions, and denying further access to the configuration program prior to placing the meter in service.

The prior art, although enhancing meter reliability by providing for the customization of fully assembled meters, again may be seen to inherently prevent the reconfiguring of a meter. Security considerations dictated the need for the aforementioned prohibition on reconfiguration. In fact, postage meters have traditionally been fabricated in such a manner as to render further use virtually impossible if reconfiguration or disassembly was attempted by the operator. Current manufacturing techniques call for NVMs and postage meter Random Access Memory (RAM) to be soldered in place. This in effect dictates that memories can not be interchanged, replaced or swapped without disassembly at the component level. This can lead to damage of sensitive meter components and in the case of testing, the loss or destruction of failure data.

The traditional approach to providing meter security, in part by not allowing certain meter parameters to be changed and not permitting the reconfiguration of a meter after final assembly, has given way to the desire to be able to have the flexibility to perform reconfiguration post assembly while maintaining security. This would enable a given meter to be operated in one country and then allow it to be reconfigured for use in another country.

An electronic postage meter which permits post assembly access by authorized personnel to various defined meter security levels (and particular parameters) is set forth in copending application Ser. No. 823,901, patent pending, incorporated herein and cross-referenced hereinbefore.

In addition, as far as security is concerned, it should be understood that prior art methods for manufacturing and initializing a meter typically involve interaction between the meter, an operator and a data center to correlate a meter's serial number with an encrypted meter ID called a "seed", stored in both the meter and at the data center. Besides being used to uniquely identify a meter, the seed is used to specify and keep track of sensitive meter data such as the amount of postage the meter is authorized to print.

The prior art methods for "seeding" sealed meters requires the operator to handle magnetic tapes or other hard copies of these highly sensitive seed values.

Finally, the prior art also requires the use of storage within the meter itself to store configuration programs, thereby requiring such programs to be maintained and take up storage that could be utilized for other purposes.

It is the need to maintain overall security in programmable electronic postage meters; to be able to initialize, configure, and reconfigure meters post assembly; to be able to handle sensitive meter data in a manner transparent to the user; to be able to perform nondestructive testing and to be able to maximize the use of a meter's resources (e.g. program store), that sets the backdrop for the invention described hereinafter.

SUMMARY OF THE INVENTION

It is an object of the invention to permit fully assembled meters to be customized post assembly.

It is a further object of the invention to permit the configuration and reconfiguration of meters both before and after being placed in service.

It is yet a further object of the invention to provide for testing fully assembled meters intact without the possibility of destroying data via disassembly.

A further object of the invention is to perform meter customization in a manner that is virtually transparent to the user to thereby maximize the security of sensitive meter data.

It is still a further object of the invention to optimize the use of internal meter resources, such as internal program store, by permitting secure customization of a meter from an external source, eliminating the need to maintain infrequently used programs on board the meter.

According to the invention, meters are customized under external, i.e. nonmeter resident, program control. The external program control may be used to initialize meters, produce "blank" (unconfigured) meters, and configure either blank or previously configured meters, both at the factory and in the field The ability to reconfigure fully assembled meters permits devices which have been configured for operation in one country to be reconfigured and placed into service in another country.

The invention may be used to customize meters in a manner that is transparent to the operator, maximizing the security of sensitive meter data by minimizing operator handling and access to such data. The invention also facilitates the "nondestructive" testing of fully assembled meters, i.e. meters need not be taken apart to, for example, analyze failures where a risk of losing data or the cause of a malfunction may result from disassembly. In addition, by minimizing the amount of resident meter software required to perform secure customization, the invention optimizes the use of internal meter resources, in particular, program storage.

The apparatus disclosed hereinafter for achieving the objects of the invention comprises a programmable operator interactive device situated externally and coupled to a programmable electronic postage meter via a communications link. The external programmable device, including means for storing data sets comprised of initialization data and country dependent operating data, and diagnostics, is suitable for responding to operator commands to generate initialization, configuration and test outputs for communication over said link for storage in said meter.

The operating characteristics of a meter receiving the configuration dependent parameters are altered since the function of the internal meter operating programs may be changed by overwritting or altering their NVM data base. NVM typically has portions reserved for defining a postage meter's format, recharge ability, serial number and seed values, or combination locks, that make each meter unique. Subsequent alteration or overwritting by a new configuration dependent parameter set output by the external programmable device achieves the reconfiguration of a meter. The programmable device is also operative to retrieve data from meters coupled to it via said link, to "poll" or monitor the meter to determine its existing configuration state and to perform tests on the meter.

Other objects, aspects and advantages of the present invention will be apparent from the detailed description considered in conjunction with the preferred embodiment of the invention illustrated in the drawings, as follows.

BRIEF DESCRIPTION OF THE DRAWING

Reference is now made to the Drawing wherein like reference numerals designate similar elements in the various views.

DETAILED DESCRIPTION

Figure 1:
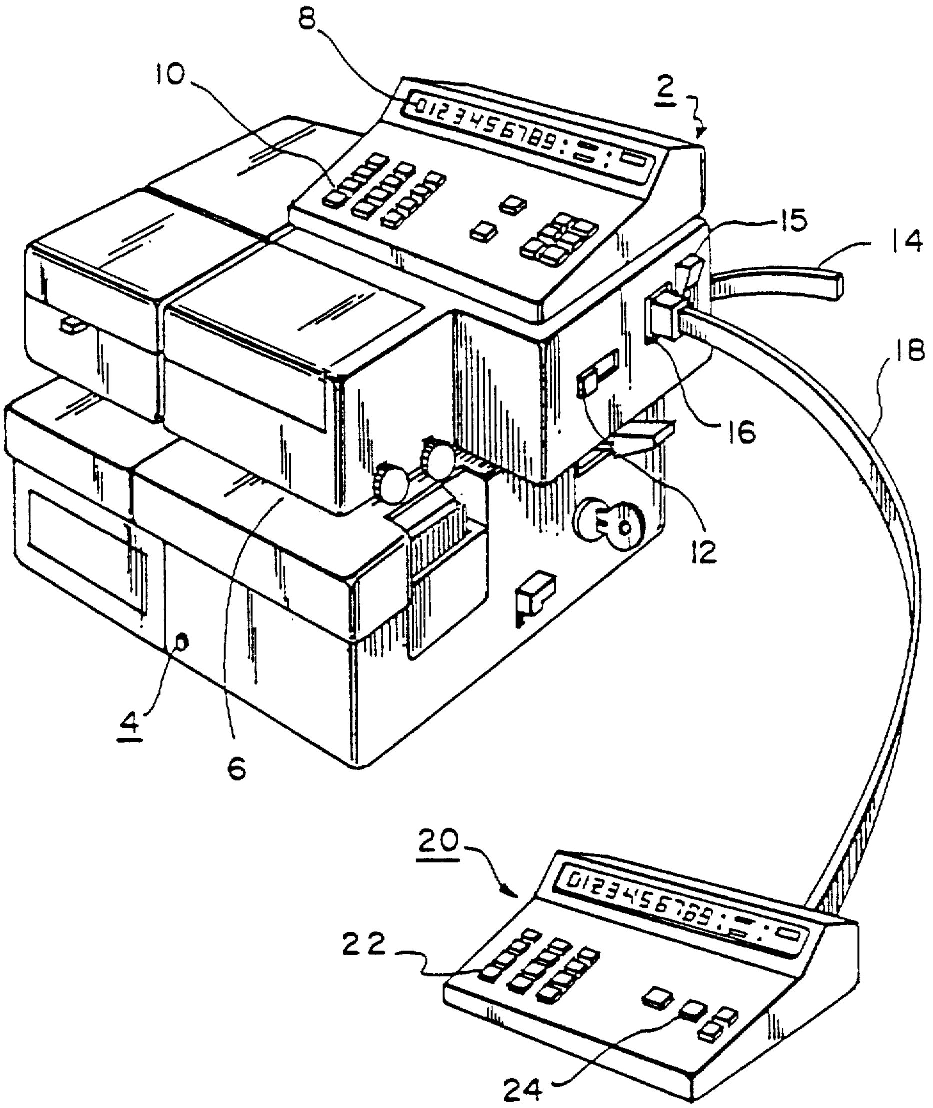
FIG. 1 is a perspective view of an electronic postage meter suitable for use with the present invention.

Reference is now made to FIG. 1. FIG. 1 is a perspective view of a postage meter adapted to be utilized with the present invention. An electronic postage meter 2 is removably secured to a postage meter base 4. In this arrangement, a slot 6 is provided between the postage meter 2 and the base 4 at the forward edge thereof, for receiving envelopes or the like for the printing of postage thereon. The postage meter is provided with a display panel 8, preferably an electronic display device, as well as a control panel or keyboard 10.

The meter 2 includes a service mode switch 12. Power is applied to the meter 2 via an AC power line cord 14 when the meter power switch 15 is turned on. The meter also includes a communications port 16 which is shown connected by a communications cable 18 to personalization unit 20. Personalization unit 20, to be described in detail hereinafter, represents the preferred embodiment for customizing and testing an electronic postage meter with apparatus situated external to meter 2. Personalization unit 20 is removable from the meter by detaching cable 18 from the communications port 16. In addition, a plurality of meters may be simultaneously connected to-personalization unit 20 if desired. Communications between meter 2 and external personalization unit 20 may be in accordance with the serial communication echoplex technique described in U.S. Pat. No. 4,301,507 for ELECTRONIC POSTAGE METER HAVING PLURAL COMPUTING SYSTEMS.

Figure 2:
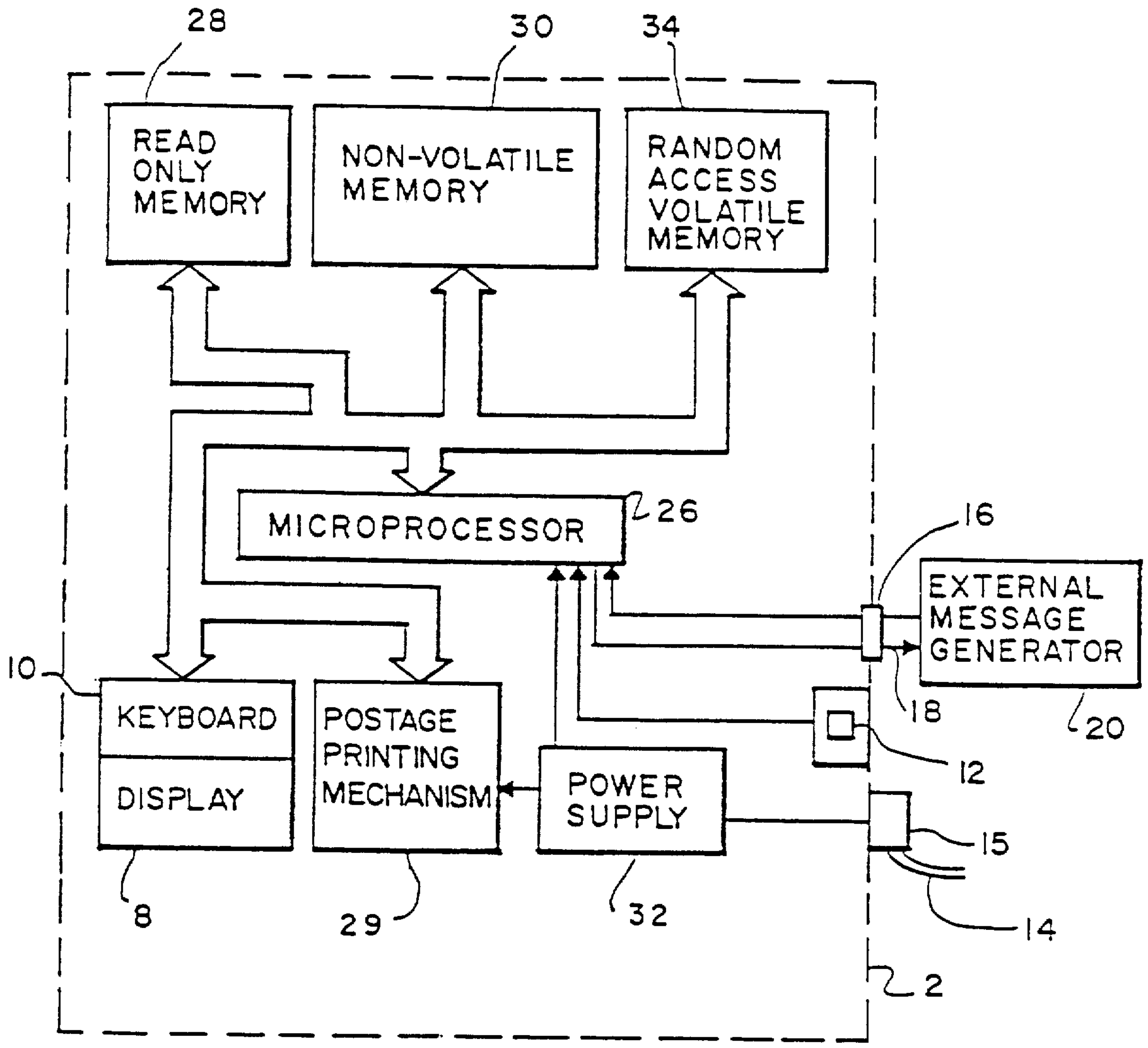
FIG. 2 is a block diagram showing one arrangement of the internal major components of an electronic postage meter suitable for use with the present invention.

FIG. 2 depicts in block diagram form, one arrangement of the internal major components of an electronic postage meter suitable for use with the present invention. The electronic postage meter 2 is controlled by a microprocessor 26 operated under control of a series of programs stored in a read only memory 28. Connected to the microprocessor are the keyboard 10 and display 8 as well as a postage printing mechanism 29. The microprocessor accepts information entered via the keyboard or via the communications port 16 from personalization unit 20 over the communications channel 18. Critical accounting and other information is stored in one or more nonvolatile memories such as nonvolatile memory 30. The nonvolatile memory may be an MOS semiconductor type memory, a battery augmented CMOS memory, or other suitable nonvolatile memory component.

The function of nonvolatile memory is to store critical postage meter data during those times when the power is not applied to the meter. This data may include, in addition to the serial number of the meter, information as to the amount of the descending register (the amount of postage available for printing), the value of the ascending register (the total amount of postage printed by the meter), and the value of the piece count register (the total number of cycles the meter has performed), as well as other types of data, such as service information, and country dependent operating parameters which are desired to be retained in the memory when no power is applied to the meter.

The various types of data to be stored in NVM may be further characterized and classified by defining levels of security, i.e., a "hierarchy of secure data". This permits the reservation by design of portions of NVM for each of said levels.

By way of example, the serial number may be defined as "level 0" data, i.e. the most secure type of information stored in NVM. The postage meter can be designed so that this type of data may only be modified by a highly restricted set of persons given the "key" (e.g. an authorization code) to level 0. Money dependent parameters, for example a parameter indicating how much postage is available for printing, might also be defined as a level 0 parameter or as a parameter in any other level (i.e. in another secure portion of NVM) with limited access. Information such as the value of the maximum piece of postage that may be printed and routine service data may be assigned to other less secure "levels" i.e., be stored in portions of NVM reserved for data where controlled access to the program which can modify these other levels is open to a wider and/or different set of authorized personnel.

When the meter power switch 15 is turned on, causing the power supply 32 internal to the meter to energize the microprocessor 26 and the postage printing mechanism 29, the information stored in the nonvolatile memory is transferred via the microprocessor to a volatile random access memory 34. The volatile, random access memory 34 after power up contains an image or copy of the information stored in nonvolatile memory prior to energization. During operation of the postage meter, data in the volatile, random access memory 34 is modified. Accordingly, when postage is printed, the descending register will be decremented, the ascending register incremented and the piece counter register incremented. When the power switch 15 is turned off, the modified image, the current updated data in the volatile, random access memory is transferred via the microprocessor back into a suitably prepared area of nonvolatile memory. Thus, nonvolatile memory is updated during the power down cycle when the power switch 15 is turned off. A like transfer of information between nonvolatile memory and the volatile random access memory also occurs when the service mode switch 12 is actuated. Alternatively the NVM could be updated each time postage is printed, thus acting as random access memory during operation thereby eliminating the updating at initialization and power down time.

Copending application Ser. No. 823,901 discloses methods and apparatus for permitting authorized personnel to store and modify sensitive meter parameters comprising means for printing postage; computing means for accounting for printed postage; data entry means for entering messages into the computing means; one or more nonvolatile memories for storing a plurality of predetermined levels of secure data; and program storage means containing programs which control the operation of said computing means and which includes a program operable to identify which predetermined level of secure data, if any, is reference by an entered message. The preferred embodiment of the meter disclosed in said copending application, and suitable for use with the instant invention, includes a set of bit locks in NVM each uniquely associated with each one of the predetermined levels of secure data and a program operable to determine if the bit lock associated with an identified level is set.

Messages may be entered to the meter described in copending application Ser. No. 823,901 from an external source, such as personalization unit 20, to (1) unlock a level upon presentation of an appropriate authorization code, (2) change portions of NVM where authorized and (3) lock NVM after successfully making a specified change. Furthermore, the methods and apparatus disclosed in said copending application eliminate the need to physically remove the NVM in order to accomplish initialization, modification and/or reconfiguration by providing controlled access to all or part of the memory storing the secure hierarchy of data.

The present invention goes beyond permitting data in a meter to be modified from an external source via sending individual messages over the echoplex link, by providing a secure vehicle for authorized personnel to automatically and completely customize and/or test a fully assembled meter with single step operations.

Figure 3:
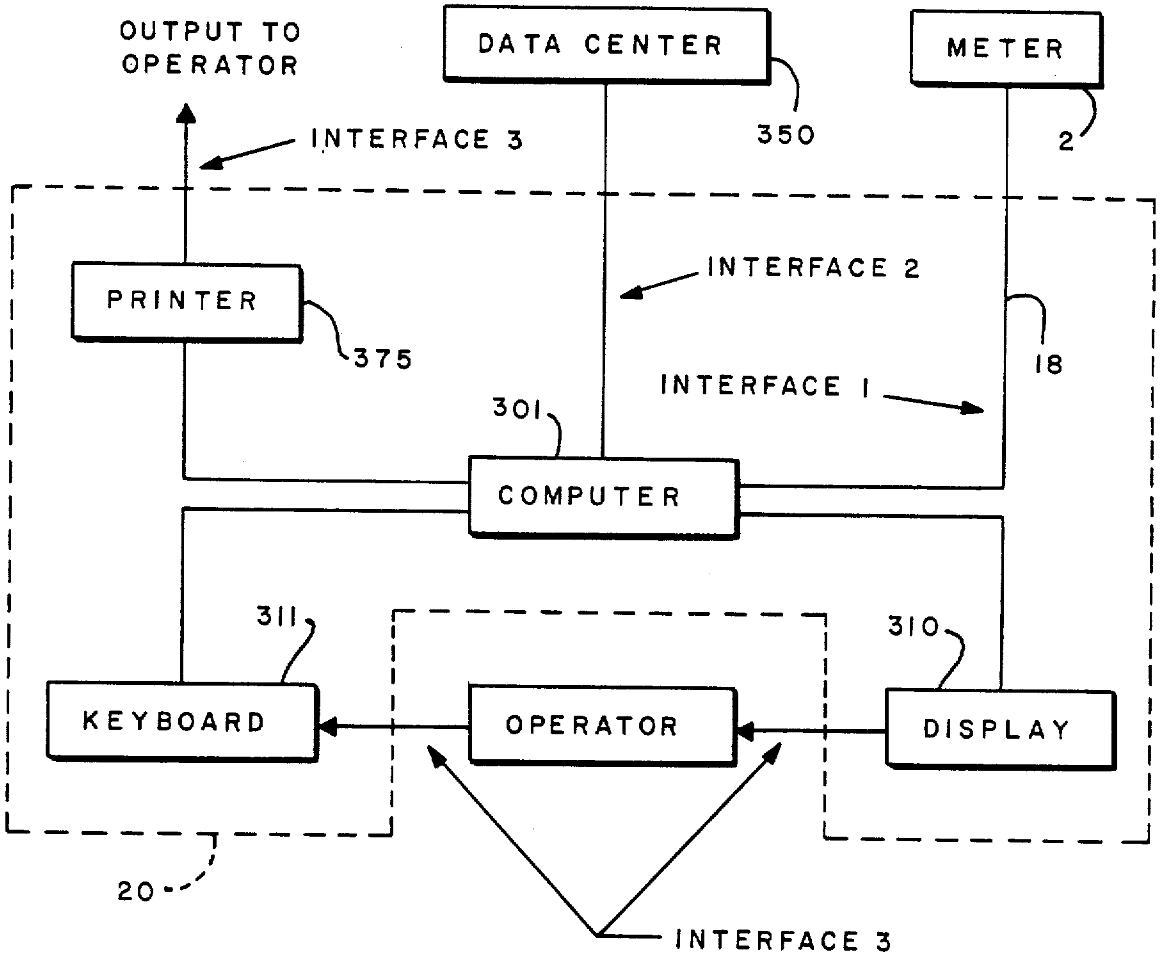
FIG. 3 is a block diagram of the apparatus for customizing and testing fully assembled postage meters in accordance with the teaching of the invention.

Reference is made to FIG. 3 which-depicts the details of the preferred embodiment of personalization unit 20 of FIG. 2. FIG. 3 shows computer 301 connected to an electronic postage meter 2 via output link 18 (the echoplex link). Computer 301 is shown interacting with a user via output display 310 and input keyboard 311. Also depicted in FIG. 3 is an interface between computer 301 and electronic funds data center 350 (hereinafter referred to as "data center") and output printer device 375.

The preferred embodiment of the invention utilizes the commercially available IBM PC/XT or compatible device as computer 301. The I/0 devices can be realized by standard, off the shelf, IBM compatible printers, displays and keyboards. The meter, as indicated hereinbefore, is preferrably the secure meter which limits access to portions of NVM to authorized personnel as disclosed in copending application Ser. No. 823,901.

The preferred embodiment of the invention calls for menu driven software in computer 301 which enables a user to specify in a single step which country configuration is to be installed in the meter or set of meters attached to computer 301 via echoplex link 18. A country dependent parameter data set for each possible target country may be stored in computer 301 along with the appropriate locations (addresses) in NVM which would need to be modified. According to one embodiment of the invention, authorized personnel can specify a country configuration and change a corresponding data set, along with storage instructions (addresses) to be serially transmitted over the echoplex link to postage meter 2. This in turn enables the transmitted data to be stored in the appropriate locations of NVM under the control of microprocessor 26 (see FIG. 2), to effectively configure, or reconfigure, a meter.

Individual parameters or firmware variables can be selected for modification, or whole data sets can be overwritten. Operating in accordance with the methods set forth in copending application Ser. No. 823,901, computer 301 can be viewed as an external message generator and be used to insure that a proper authorization code is presented by an operator permitting predefined areas of the secure meter to be modified in whole or in part only when authorized.

In addition to configuring or reconfiguring a meter for operation in a given country, fully assembled meters can be initialized using personaliztion unit 20 in a manner virtually transparent to the user. This will be described hereinafter with reference to FIGS. 4A-C and the description of the unit 20/data center interface.

First, however, to facilitate a better understanding of the invention, a functional description of the software to be incorporated in personalization unit 20 will be set forth with reference to the various unit 20 interfaces that are preferably under software control.

Personalization unit 20 is shown in FIG. 3 to interface with (1) postage meter 2 (interface 1); (2) data center 350 (interface 2); and (3) the user or operator (interface 3). In addition, the software interacts with the host computer itself, effectively defining a fourth interface. For the sake of illustration only, the singular is used with reference to the above. It will become obvious to those skilled in the art that the novel unit described herein may be used to communicate with a plurality of data centers, users and meters.

As indicated hereinbefore, the first interface (between unit 20 and a meter), according to the preferred embodiment of the invention, is via the echoplex link and the meter's communications port. This is a serial communications link. As indicated before, techniques suitable for communicating with a postage meter over this link have been described in U.S. Pat. No. 4,301,507, assigned to Pitney Bowes. The preferred embodiment of the invention, in addition to incorporating software compatible with echoplex serial communications, embodies software for transmitting data over the echoplex link in scrambled form to enhance security. This is particularly useful when transmitting the aforementioned seed values. The invention defined herein does not depend on the choice of communications protocol or scrambling technique utilized, such techniques being well known to those of ordinary skill in the art.

The software for managing this first interface, according to the preferred embodiment of the invention, is further operative to set and clear lock bits in order to permit the secure electronic meter 2 to be configured and reconfigured by authorized personnel only. The techniques for performing these operations is, as indicated hereinbefore, set forth in detail, in copending application Ser. No. 823,901.

In addition, the software for the unit 20/meter interface should be able to poll or monitor an attached meter to determine its existing operational configuration, state of bit locks, etc. This may be performed simply by storing the address of the appropriate parameters, locks, etc. in the personalization unit memory and, according to one embodiment, permitting the user to retrieve said data via said communications link with the presentation of a valid authorization code to unit 20. This could be accomplished, for example, by specifying the required address(s) to microprocessor 26 in the postage meter (see FIG. 2) via the echoplex link, and using microprocessor 26 to fetch the data from appropriate memory location(s) for communication back to unit 20.

The second interface, that between unit 20 and the data center, may be realized by a standard serial communications link using a standard transmission format in accordance with ANSI X3.28 (an ASCII composition).

According to the preferred embodiment of the invention, hardcopy input, for example magnetic tape input of seed values created on a tape at a data center, can be eliminated when seeding a meter using this second interface. In addition, the input seeds, transmitted to unit 20 over this second interface, can be directly transmitted into the meter (over the first interface) with a minimum of user intervention, to make the seeding operation virtually transparent to the user.

Before continuing with the description of the unit 20/data center 350 interface, a further explanation of the importance and of the nature of the "seeding" process will be set forth. Although the technique of seeding a meter to enhance its security is well known, it is set forth herein for the sake of completeness.

The charge or recharge ability of a meter (allowing it to print postage) is allowed by a data center as long as the customer account to which a meter has been assigned can be verified. Verification is established by processing a set of code numbers embedded in and unique for each meter. Some of these codes are not published. They exist only in the memory of a computer at data center, and in meter memory.

Personalization unit 20 is equipped to receive the unique codes from the data center computer over the aforementioned second interface. The unique codes each consist of an identification number and "seed" values, which are coupled in pairs, one identification number for each seed value.

If an operator selects to initialize a meter attached to unit 20, the software controlling the seeding operation will extract the identification number from the unique code, to be used in the manner described hereinafter, and transmit the seed value to the meter. The serial number may be input to meter memory at this time and become part of the unique code replacing the identification number originally provided by the data center. The serial number may be entered into unit 20 by the user via any available input means, (keyboard, tape, etc.). If the serial number is already in meter memory, the number is provided to unit 20 over the echoplex link for eventual communication to a data center as described hereinafter.

After successfully seeding a meter, personalization unit 20 will erase the original seed number from its own memory. The serial number of the meter will then be passed, with its related identification number, back to the data center. The data center will thereby have a means of linking each unique code to a specific meter via a serial number/identification number pair.

It can be seen from the description above that the security of the seeding operation is maximized by making the seed handling process transparent to the user. This is accomplished by not tracking which seeds are matched to a given serial number and as indicated hereinbefore, erasing each seed value from unit 20's memory following successful echoplex transmission to the meter. Once put into motion, and during the seeding process, the keyboard and all other I/0 components on the personalization unit may, according to the preferred embodiment of the invention, be rendered inoperable to prevent operator intervention. Security may be further increased using this operator lockout option.

Figure 4A:
FIG. 4A-C depict how the invention may be used to initialize a postage meter with a "seed" communicated from a data center in a manner which is transparent to an operator.
Figure 4A:
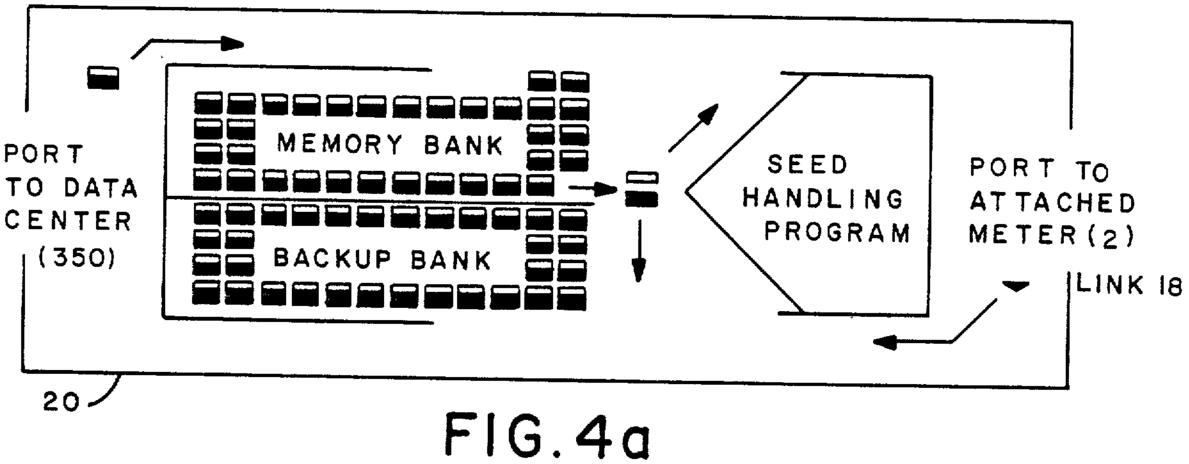
Figure 4B:
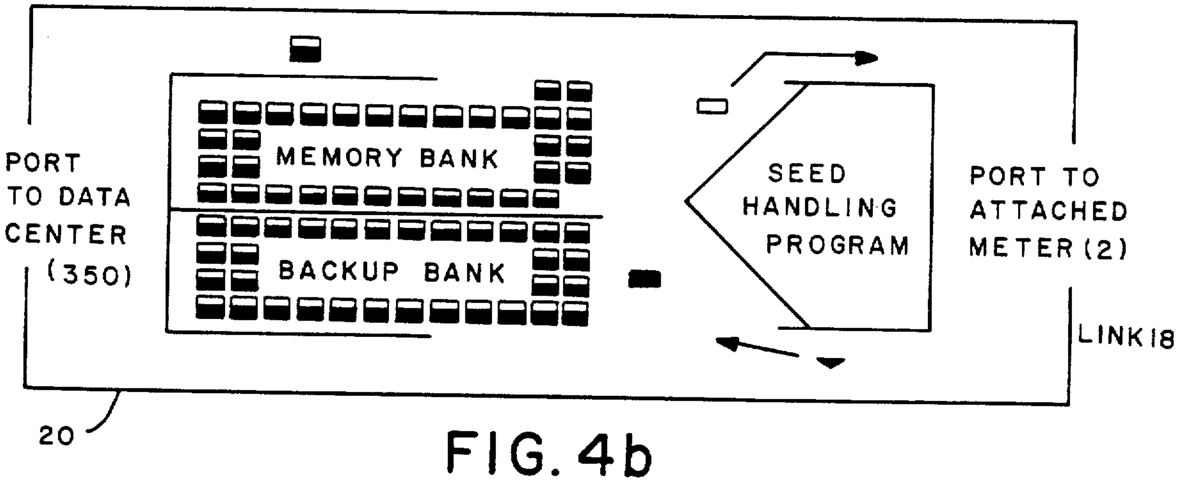
Figure 4C:
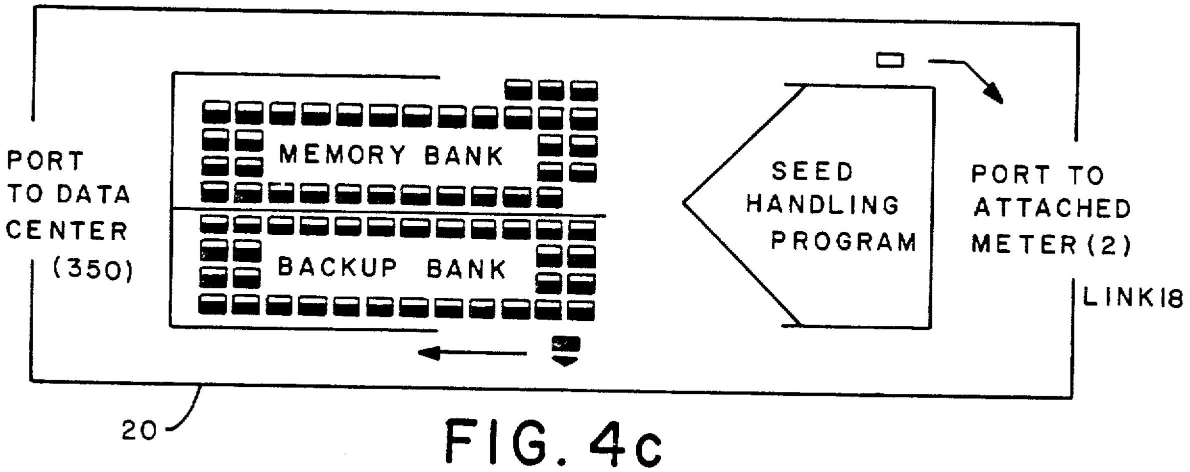

FIGS. 4*a*, 4*b* and 4*c* depict the seed handling process which, according to the preferred embodiment of the invention, is carried out by unit 20 under software control. As described above, the seed/identification number pairs (the unique codes) may be seen input to unit 20 (FIG. 4a) and stored in a memory bank (and/or backup memory bank) as data sets.

The ID number may be observed as separated by unit 20 software from the seed value (FIG. 4*b*). The attached meter serial number is seen input to unit 20 via echoplex link 18 (FIG. 4*a*), and finally, the seed is transmitted to meter memory while the ID/serial number pair is shown transmitted to the data center (FIG. 4*c*).

Note that, in accordance with the preferred embodiment of the invention, no recording of the transaction is left in unit 20 memory.

Furthermore, according to the preferred embodiment of the invention, the serial communication between the personalization unit 20 and the data center is automatic. If a data center is busy or if communications fail, unit 20 is capable of operating off of a stored bank (backup memory) of unique codes (as shown in FIG. 4) until communications with a data center are established. Unit 20 optimally would keep in reserve a batch of seeds from the data center in case of a data center busy situation, and could periodically request a "refill" of reserve seeds.

In the event of communication failure with a data center and depletion of any reserve seeds, the preferred software for unit 20 will cause a halt to further seeding. However, other functions of the personalization system, for example reconfiguring data sets, may continue to operate.

Finally, seed values and identification numbers (i.e. the unique codes) may be entered manually, or via tape) using novel unit 20. This will not optimize the user transparency achieved via automated seeding, but provides a backup means of using unit 20 for seeding in the event communications with a data center are not established.

The third software interface referred to hereinbefore is between personalization unit 20 and an operator (i.e. the user interface). Commercially available I/0 packages for interfacing with keyboard displays, printers, etc. may be used to realize this interface. As far as special features are concerned, as indicated hereinbefore, the preferred embodiment of the invention calls for all required functions of unit 20 to be selected from displayed menus. Those of ordinary skill in the art will recognize that providing the ability to select function via menus, providing "help" menus, etc. are user interface features that may be implemented by well known techniques.

The fourth "software interface" referred to hereinbefore is the interface between unit 20 software and the hardware and software of the host system. According to the preferred embodiment of the invention, unit 20 software may be stored on a hard disk. This software may operate coresident with MSDOS, the standard disk operating system which may be purchased with an IBM-XT or compatible computer. The software xayutilizefhe IBM BIOS hardware interface subroutines residing in the XT, and the device interface subroutines available through MSDOS when and if those utilities favor program design. Portability to IBM-XT compatibles or to future versions of the disk operating system are not required.

Environment monitors may be installed in the software. The monitors exercise a priority control over execution of the unit 20 software. Allperipherals resident in the hardware may be monitored.

The preferred embodiment of the invention also calls for a battery backed clock which maintains time and date, and is accessible by the unit 20 software.

Meter and data center transactions with personalization unit 20 may be concurrently stored on hard disk to protect against power failure errors. Intermediate transaction files and write protected master files may be used in disk operations. Power up tasks are optimally designed to include inspection for and recovery from power supply interruption.

Having provided a functional description of personalization unit 20's software in terms of the unit's interfaces, and a description of the hardware and software of a suitable host system, one may now appreciate that the unit may be utilized to realize the objectives stated hereinbefore.

Specifically, transparent communications, (particularly when performing the seeding operation), may be conducted between a data center (using unit 20 interface 2) and a meter (using interface 1), with the process being initiated by an operator (over interface 3).

Furthermore, a user may configure and reconfigure attached meters (over interfaces 1 and 3) in a highly secure manner.

It will be recognized by those skilled in the art that the ability to poll or monitor a meter as to its current configuration and to receive data from an attached meter, over the echoplex link, provides a means to test a meter by reading out parameters stored anywhere within a meter within reach of microprocessor 26 of FIG. 2. Hence, a nondestructive test feature is realized using the invention defined herein.

Finally, by maintaining the data sets for various configurations, user communications programs, etc. outside the meter and in unit 20, the use of meter 2 resources is optimized by freeing storage for other programs or data.

It is known and understood for the purpose of the present application that the term postage meter refers to the general class of devices for the imprinting of a defined unit value for governmental or private carrier delivery of parcels, envelopes or other like application for unit value printing. Thus, although the term postage meter is utilized, it is both known and employed in the trade as a general term for devices utilized in conjunction with services other than those exclusively employed by governmental postage and tax services. For example private, parcel and freight services purchase and employ such meters as a means to provide unit value printing and accounting for individual parcels.

It should be apparent to those skilled in the art that various modifications may be made in the present invention without departing from the spirit and scope thereof as described in the specification and defined in the appended claims.

What is claimed is:

1. Apparatus for customizing firmwave stored in the memory of an assembled electronic postage meter, said apparatus being located external to said meter, comprising:

(a) means for storing at least one data set;

(b) means for inputting a user command to produce a blank meter; and (c) means, responsive to said command to produce a blank meter, for clearing a predetermined portion of meter memory, (d) means for inputting at least one user command to select a data set for transmission to said meter; and (e) means, responsive to said commands, for transmitting a selected data set from said means for storing, to said meter, for storing in a predetermined portion of meter memory.

2. Apparatus as set forth in claim 1 wherein at least one of said data sets is comprised of country dependent meter operating parameters which when stored in predetermined portions of meter memory subsequently interact with meter operating programs to customize the meter.

3. Apparatus as set forth in claim 1 further comprising:

(a) means for selectively retrieving data from said meter memory; and (b) means for selectively outputting said retrieved data to a data center and the user.

4. Apparatus as set forth in claim 3 wherein said means for selectively retrieving data is operative to retrieve failure data which may be used to facilitate the non-destructive evaluation of the condition of said meter.

5. Apparatus as set forth in claim 3 wherein said means for selectively retrieving data is operative to poll and monitor a meter to determine its existing configuration.

6. Apparatus as set forth in claim 3 wherein said means for selectively retrieving data is operative to retrieve the current state of an existing meter seed value.

7. Apparatus for customizing firmware stored in the memory of an assembled electronic postage meter, said apparatus being located external to said meter, comprising:

(a) means for storing at least one data set;

(b) means for inputting a user command to produce a blank meter; and (c) means, responsive to said command to produce a blank meter, for clearing a predetermined portion of meter memory.

(d) means for inputting at least one user command to select a data set for transmission to said meter; and (e) means, responsive to said commands, for transmitting a selected data set from said means for storing, to said meter, for storage in a predetermined portion of meter memory; and, (f) means for detachably interfacing with a data center wherein at least one of said data sets comprises a unique code input to said means for storing, from said data center, via said means for interfacing.

whereby said apparatus can be detached from said data center and transported to said meter, and there detachable mounted to said meter.

8. Apparatus as set forth in claim 7 wherein said means for interfacing comprises a direct serial communications channel.

9. Apparatus as set forth in claim 7 wherein each unique code comprises an identification number and seed value pair.

10. Apparatus for customizing firmware stored in the memory of an assembled electronic postage meter, said apparatus being located external to said meter, comprising:

(a) means for storing at least one data set;

(b) means for inputting a user command to produce a blank meter; and (c) means, responsive to said command to produce a blank meter, for clearing a predetermined portion of meter memory, (d) means for inputting at least one user command to select a data set for transmission to said meter; and (e) means, responsive to said commands, for transmitting a selected data set from said means for storing, to said meter, for storage in a predetermined portion of meter memory; and, (f) means for detachably interfacing with a data center wherein at least one of said data sets comprises a unique code input to said means for storing, from said data center, via said means for interfacing, said unique code being a identification number and seed value pair.

(g) means, responsive to a user input command to initialize said meter, for retrieving one of said unique codes from said means for storing and for separating the identification number portion from the seed value portion of said code; and (h) means for transmitting the seed value portion of said separated code to said meter for storage in a predetermined portion of meter memory.

whereby said apparatus can be detached from said data center and transported to said meter, and there detachable mounted to said meter.

11. Apparatus as set forth in claim 10 further comprising:

(a) means for determining the serial number of said postage meter;

(b) means for forming an identification number/serial number pair, comprised of said determined serial number and the identification number which corresponds to the separated seed value transmitted to the meter bearing the aforesaid serial number; and (c) means for transmitting said formed pair to said data center 12. Apparatus as set forth in claim 11 further comprising means for erasing said serial number, said identification number and said seed value from said means for storing.

13. Apparatus as set forth in claim 11 further comprising means for inhibiting user input/output communications whenever a postage meter is being initialized.

14. A programmable operator interactive device externally coupled to an assembled postage meter, comprising:

(a) means for storing country dependent configuration data sets;

(b) means for inputting commands to select one of said data sets for transmission to and storage in said meter; and (c) means, responsive to said input commands, for transmitting a selected country dependent data set for said meter for storage therein.

15. A device as set forth in claim 14 further comprising means for receiving input from a data center, including means for storing unique codes generated at said data center wherein each code comprises an identification number and seed value pair.

16. A device as set forth in claim 15 further comprising:

(a) means, responsive to a user input command to initialize said meter, for retrieving one of said unique codes from said means for storing codes and for separating the identification number portion from the seed value portion of said code;

(b) means for transmitting the seed value portion of said separated code to said meter for storage in a predetermined portion of meter memory;

(c) means for determining the serial number of said postage meter;

(d) means for forming an identification number/serial number pair, comprised of said determined serial number and the identification number which corresponds to the separated seed value transmitted to the meter bearing the aforesaid serial number; and (e) means for transmitting said formed pair to said data center.

17. Apparatus, externally coupled to an assembled postage meter, for customizing the firmware of an assembled electronic postage meter, comprising:

(a) means for storing at least one data set;

(b) means for selecting one of said data sets for transmission to and storage in said assembled meter;

(c) means, coupling said means for storing and said assembled meter, for transmitting selected data sets from said means for storing to said assembled postage meter; and (d) means for indicating the appropriate storage locations of said assembled meter within which to store said transmitted data.

18. Apparatus as set forth in claim 17 wherein said means for coupling is a serial echoplex communications link.

19. Apparatus as set forth in claim 17 wherein at least one of said data sets is comprised of country dependent meter operating parameters for a postage meter which when stored in said meter subsequently interact with meter operating programs to customize the meter.

20. A method for customizing a fully assembled postage meter utilizing a programmable operator interactive device externally coupled to said meter, comprising the steps of:

(a) storing country dependent configuration data sets in said device;

(b) inputting commands to said device to select one of said data sets for transmission to and storage in said meter; and (c) transmitting a selected country dependent data set to said meter for storage therein.

21. A method as set forth in claim 20 further comprising the step of storing unique codes generated by a data center in said device.

22. A method as set forth in claim 21 wherein each unique code comprises an identification number and seed value pair.

23. A method as set forth in claim 22 further comprising the steps of:

(a) retrieving one of said unique codes from said device;

(b) separating the identification number portion from the seed value portion of said code;

(c) transmitting the seed value portion of said separated code to said meter for storage in a predetermined portion of meter memory;

(d) determining the serial number of said postage meter;

(e) forming an identification number/serial number pair, comprised of the identification number which corresponds to the separated seed value transmitted to the meter bearing the aforesaid serial number; and (f) transmitting said formed pair to said data center.

* * * * *